United States Patent
Banker et al.

[11] Patent Number: 6,041,487
[45] Date of Patent: Mar. 28, 2000

[54] METHOD FOR PRODUCING SEALING SURFACES ON A TUBULAR MEMBER

[75] Inventors: Edward O. Banker; Erich F. Klementich, both of Houston, Tex.

[73] Assignee: Marubeni Tubulars, Inc., Houston, Tex.

[21] Appl. No.: 09/073,660

[22] Filed: May 6, 1998

Related U.S. Application Data

[60] Division of application No. 08/895,018, Jul. 16, 1997, Pat. No. 5,765,836, which is a continuation-in-part of application No. 08/588,179, Jan. 18, 1996, abandoned.

[51] Int. Cl.⁷ .................................................. B23P 13/04
[52] U.S. Cl. .......................................... 29/558; 29/407.09
[58] Field of Search ........................... 29/557, 558, 456, 29/407.09, 407.02; 82/1.11; 277/603, 612, 626; 285/333, 334

[56] References Cited

U.S. PATENT DOCUMENTS

| | | |
|---|---|---|
| 2,295,874 | 9/1942 | Stone et al. . |
| 2,636,753 | 4/1953 | Griffin . |
| 3,561,302 | 2/1971 | Keener . |
| 3,854,760 | 12/1974 | Duret . |
| 3,870,351 | 3/1975 | Matsuki . |
| 4,281,430 | 8/1981 | Hellnick . |
| 4,375,708 | 3/1983 | Hellnick et al. . |
| 4,384,737 | 5/1983 | Reusser . |
| 4,508,375 | 4/1985 | Patterson et al. . |
| 4,550,937 | 11/1985 | Duret . |
| 4,665,780 | 5/1987 | Plaquin et al. . |
| 4,708,038 | 11/1987 | Hellnick et al. . |
| 5,144,871 | 9/1992 | Niwa . |
| 5,358,289 | 10/1994 | Banker et al. . |
| 5,363,545 | 11/1994 | Hirano et al. . |
| 5,415,442 | 5/1995 | Klementich . |
| 5,427,418 | 6/1995 | Watts . |
| 5,462,315 | 10/1995 | Klementich . |
| 5,468,029 | 11/1995 | Blose et al. . |
| 5,498,035 | 3/1996 | Blose et al. . |

FOREIGN PATENT DOCUMENTS

| | | | |
|---|---|---|---|
| 22-293 | 1/1991 | European Pat. Off. | 82/1.11 |
| 0 603 109 A1 | 6/1994 | European Pat. Off. | 82/1.11 |
| 4-80497 | 3/1992 | Japan | 82/1.11 |

*Primary Examiner*—David P. Bryant
*Attorney, Agent, or Firm*—Conley, Rose & Tayon, P.C.

[57] ABSTRACT

The metal-to-metal sealing system includes a first seal configuration on one member of the connection and a second seal configuration on the other member. Each seal configuration includes an annular groove and an adjacent annular tooth. The annular groove and annular tooth form three frustoconical surfaces with the groove having an annular undercut surface and the annular tooth having an annular shoulder surface. A seal cylindrical surface and a pre-ramp cylindrical surface extend from the mouth of the groove and a frustoconical ramp forms the transition surface between the seal and pre-ramp cylindrical surfaces. Further, at the base of the outer side of the annular tooth, there extends a cylindrical surface along the main body of the member. Upon makeup of the connection, the ramps and seal cylindrical surfaces guide and align the seal configurations. Initially the center frustoconical surfaces interferingly engage. Upon further tightening of the connection, the teeth are funneled into the grooves with the teeth being wider than the width of the grooves causing the other frustoconical surfaces to interferingly engage. Upon final power tightening of the connection, the annular shoulder surface and undercut surfaces engage whereby upon final makeup, up to seven seals are formed. Six of the sealing surfaces on each seal configuration are cut by a single plunge cut of a carbide tool insert.

17 Claims, 7 Drawing Sheets

METHOD FOR PRODUCING SEALING SURFACES ON A TUBULAR MEMBER

This is a division of Ser. No. 08/895,018, filed Jul. 16, 1997, now U.S. Pat. No. 5,765,836, which is a continuation-in-part of Ser. No. 08/588,179, filed Jan. 18, 1996, now abandoned.

BACKGROUND OF THE INVENTION

1. Field of the Invention

The present invention relates to connections of the kind commonly used in the oil industry and more particularly to a sealing system for sealing the connection between two members such as cylindrical or tubular members.

2. Background Art

The present invention is applicable broadly for use in joining tubular members, pipes, casing, tubing, wellheads, couplings, and the like, and has particularly been developed for use in oilfield tubular connections. Various forces are applied to an oilfield connection as for example, interior pressure, exterior pressure, tension, compression, bending, torsion and non-axi-symmetric forces. It is important that the oilfield connection maintain a seal, preferably a metal-to-metal seal, as various forces and combinations thereof are applied to the connection. Oilfield connections between tubular members, such as downhole pipe, experience the most severe and demanding conditions.

One type of sealing system is disclosed in U.S. Pat. Nos. 5,415,442 and 5,462,315, incorporated herein by reference. Those patents disclose a stabilized center-shoulder-seal tubular connection. This connection is stabilized using at least one run-out section of threads adjacent the center-shoulder seal configuration of each connection member. The run-out section of threads is typically used in combination with a run-in section of threads on the corresponding connection member. The stabilization of the connection at its center provides a stabilization of the seals at the center shoulders.

The center-shoulder seal of the '442 and '315 patents includes pin and box members each having a center shoulder configuration and a ramp. Each center shoulder configuration includes an annular groove forming an adjacent annular shoulder. The annular shoulder forms a ring surface and the groove forms an annular undercut surface. An exterior cylindrical ramp surface is formed on the exterior of the shoulder and a cylindrical center surface is formed on the interior of the shoulder. An exterior sealing surface, in the form of a bevel or chamfer, extends between the ring surface and the exterior cylindrical ramp surface. The undercut surface forms an interior cylindrical ramp surface and an interior sealing surface, in the form of a bevel or chamfer, extending between the interior cylindrical ramp surface and the undercut surface.

Upon the assembly of the center shoulder seal disclosed in the '442 and '315 patents, the ramps on the pin and box members engage the interior and exterior cylindrical ramp surfaces to align and guide the center shoulder configurations together. As the assembly progresses, a metal-to-metal seal is created as the interior and exterior sealing surfaces engage. The engagement of the interior and exterior sealing surfaces causes the annular shoulders to bend inwardly to close the gap between the cylindrical center surfaces on the annular shoulders thereby producing a zero clearance seal. However, the latter may not seal if there is substantial clearance between the cylindrical center surfaces prior to the bending motion. The sealing engagement of the cylindrical center seals is merely a consequence of the interior and exterior sealing surfaces bending the shoulders inwardly.

Upon the final power tightening (torquing) of the assembled connection, the ring surfaces contact the undercut surfaces thereby creating two additional zero clearance seals. Thus, a total of at least four and possibly five seals are created during makeup: two seals at the interior and exterior sealing surfaces, and three zero clearance seals, one at the cylindrical center surfaces, and two at the ring and undercut surfaces. Typically, a thread compound is used on the surfaces of the threaded connection to assist the intended zero clearance seals to bridge any surface defects or machine tolerances which result in a clearance between metal surfaces of less than about 0.005 inches. In the sealing system of the '442 and '315 patents, the sealing system includes a cylindrical center seal, the interior and exterior seals, and the shoulder/undercut seals.

The sealing system disclosed in the '442 and '315 patents is located at the center of the body of the connection and thus the sealing system is encapsulated in a static field which is isolated from the various loads placed on the connection which might otherwise tend to unseal the seals. The interior and exterior seals caused by the sealing engagement of the interior and exterior sealing surfaces cause the annular shoulders to bend inwardly and preferably cause the mating cylindrical center surfaces to form a sealing engagement, i.e. a zero clearance seal.

One disadvantage of prior art metal-to-metal sealing systems is that the absolute positions of the metal-to-metal sealing surfaces must be maintained with respect to the pin and box members. Prior art sealing systems must have sealing surfaces that have absolute diametrical positions with respect to the pin and box members to achieve the desired contact pressure between the sealing surfaces so as to form a seal. The absolute positions for prior art sealing surfaces on each member are measured from a reference point on each of the pin and box members so that upon connecting the pin and box members, the sealing surfaces have sufficient contact pressure so as to form metal-to-metal seals. Typically, the reference point is the shoulder in the box member which registers with the terminal end of the pin member.

The nominal dimensions of the sealing surfaces are the design dimensions. Each nominal dimension has a range of tolerances so as to form a band or range of dimensions which are plus or minus the nominal dimension. To ensure sealing engagement, the actual dimension of the sealing surface must fall within the range of tolerances of the nominal dimension. Therefore, to achieve sealing engagement, the actual dimensions of the sealing surfaces must fall within the tolerance band so as to have the required absolute positioning with respect to the pin and box members. Failure to have the proper absolute positioning of the sealing surfaces with respect to the pin and box members will prevent the sealing surfaces from forming the desired metal-to-metal seal.

The absolute dimensions of the sealing surfaces require a very narrow band of tolerances since even a few thousandths of an inch of interference can greatly affect the sealing contact between the sealing surfaces. Thus, the diameter and length of the sealing surfaces from the reference point must be maintained within the band of tolerances to ensure the establishment of a metal-to-metal seal.

The sealing surfaces on the pin and box members are typically cut using a computer numerical control (CNC) machine. The CNC machine supports a carbide tool insert which cuts the sealing surfaces. Typically, the sealing surfaces of a prior art sealing system are cut by making multiple passes of the carbide tool insert to produce multiple sealing surfaces, all having an absolute position with respect to the pin and box members. The CNC machine and operator must control the carbide tool in four directions, right and left of the reference point and in and out with respect to the reference point. However, multiple passes or strokes of the carbide tool insert for cutting multiple sealing surfaces allows greater variances in the diametrical dimensions of the sealing surfaces causing greater probability of having an actual dimension which falls outside the tolerance range.

The large number of sealing surfaces exacerbates the objective of achieving close tolerances to ensure metal-to-metal sealing engagement. For example, the sealing system of the '442 and '315 patents requires that seven different sealing surfaces be controlled on each complimentary pin and box member of the connection. Not only must the absolute position of the diametrical dimensions of the cylindrical surfaces be maintained but also the tolerances of the various relief angles and radiuses.

Typically, the absolute positioning of the sealing surfaces must be maintained to tolerance of at least 0.002 inches and preferably 0.001 inches for premium connections. Whenever these tolerances are not achieved, the connection must be recut to meet specifications which adds further cost and expense. This is particularly a problem where tolerances must be held to ±0.001 inches since such close tolerances are difficult and costly to maintain for the reasons previously described.

The present invention overcomes the deficiencies of the prior art.

SUMMARY OF THE INVENTION

The metal-to-metal sealing system of the present invention includes a first seal configuration on the pin member and a second seal configuration on the box member. Each seal configuration includes an annular groove and an adjacent annular tooth. The annular groove has tapering sides and an annular undercut surface. The annular shoulder also has tapering sides tapering to an annular shoulder surface. The annular groove and tooth share a common tapering side. The tapering sides form frustoconical surfaces. A cylindrical ramp surface and a reduced diameter pre-ramp cylindrical surface extend from the mouth of the groove. A frustoconical ramp forms a transition surface between the ramp and pre-ramp cylindrical surfaces. Further, at the base of the outer side of the annular tooth, there extends a cylindrical surface along the main body of the pin or box member.

Upon makeup of the connection, the ramp surfaces on the pin and box members engage the tooth of the mating member. The ramps guide and align the mating member so as to align the seal configuration on the pin member with the seal configuration on the box member. As the assembly progresses, the teeth are funneled into the grooves. Upon further tightening of the connection, the frustoconical surfaces formed between the teeth and grooves interferingly engage. The width of the teeth is designed to be slightly wider than the width of the grooves, therefore the teeth are forced into the grooves with a designed interference fit. Upon final power tightening of the connection, the annular shoulder surfaces and undercut surfaces engage. Therefore, upon final makeup, up to seven seals may be formed, a center frustum seal, inner and outer frustum seals, two annular shoulder seals, and two cylindrical seals. The center frustum seal is in sealing (engagement under all load conditions and without regard to the tolerances of the sealing surfaces.

The sealing system of the present invention has the advantage in that the sealing surfaces need only a relative position and is insensitive to the absolute position with respect to the bodies of the pin and box members. The cylindrical surfaces and ramp surfaces guide and align the teeth into the grooves without regard to their absolute position. After the initial alignment, the wider teeth are funneled into the narrower grooves creating an interference fit at the frustum seals. This funneling effect prevents the tolerances of the frustoconical surfaces of the teeth and grooves from being critical for achieving sealing engagement.

The sealing system of the present invention has the further advantage in that six of the sealing surfaces may be cut in a single stroke of a single carbide tool insert so as to achieve close tolerances of the sealing surfaces. Because the sealing surfaces are cut by one carbide tool insert in a single plunge cut, the tolerances of the sealing surfaces approach the tolerances of the carbide tool insert. The closer tolerances of the sealing surfaces ensure sealing engagement without regard to the absolute positioning of the sealing surface with respect to the bodies of the pin and box members.

The sealing system has a still further advantage in that the sealing system is enclosed within an elastic envelope of material forming the bodies of the pin and box members. The constant makeup torque of the connection provides a constant energy into the sealing system and that energy redistributes itself to the various elements of the sealing system based on the tolerances of the sealing surfaces and the various loads placed on the connection. For example, upon placing the connection in tension, the sealing surfaces of the annular shoulders will tend to relieve their contact pressure. However, because of the energy placed in the sealing system by the makeup torque, and because the sealing system is in an elastic envelope, the contact pressure of the annular shoulders will remain in sealing contact due to the elasticity of the metal as up to 50 to 75% tension is placed on the connection.

Other objects and advantages of the present invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

It should be understood that the sealing system of the present invention may be used in any connection of two members to establish a metal-to-metal seal between mating cylindrical surfaces on the members of that connection. The present invention has particular applicability to those connections which are subject to various forces and combinations thereof including tension, compression, interior pressure, exterior pressure, bending, torsion and non-axisymmetric loads. The sailing system of the present invention may be used in tubular connections, such as drill pipe, casing, tubing, or in other oilfield equipment such as wellheads where the connection of two members is subjected to large forces and pressures requiring metal-to-metal sealing systems. Since the sealing system of the present invention is highly insensitive to manufacturing variables, the sealing system may be placed anywhere within the connection of two tubular members. Thus, the location of the sealing system of the present invention is not limited to the center of the connection and may be used at other locations in the connection such as at the nose of the connection or the outside of the connection. The present invention can also be located between two members forming a wellhead, as for example. Thus, it is to be fully recognized that the teachings of the preferred embodiment described below may be employed in a number of different types of connections and locations within the connections to produce the desired metal-to-metal sealing for that connection. Specific embodiments of the present invention are described in detail in the present application with the understanding that the present disclosure is an exemplification of the principals of the invention and is not intended to limit the invention to that as illustrated and described herein. Therefore it should be understood that although the preferred embodiment is described with respect to a tubular connection for use in the oil industry, the present invention is not limited to that application.

Figure 1:
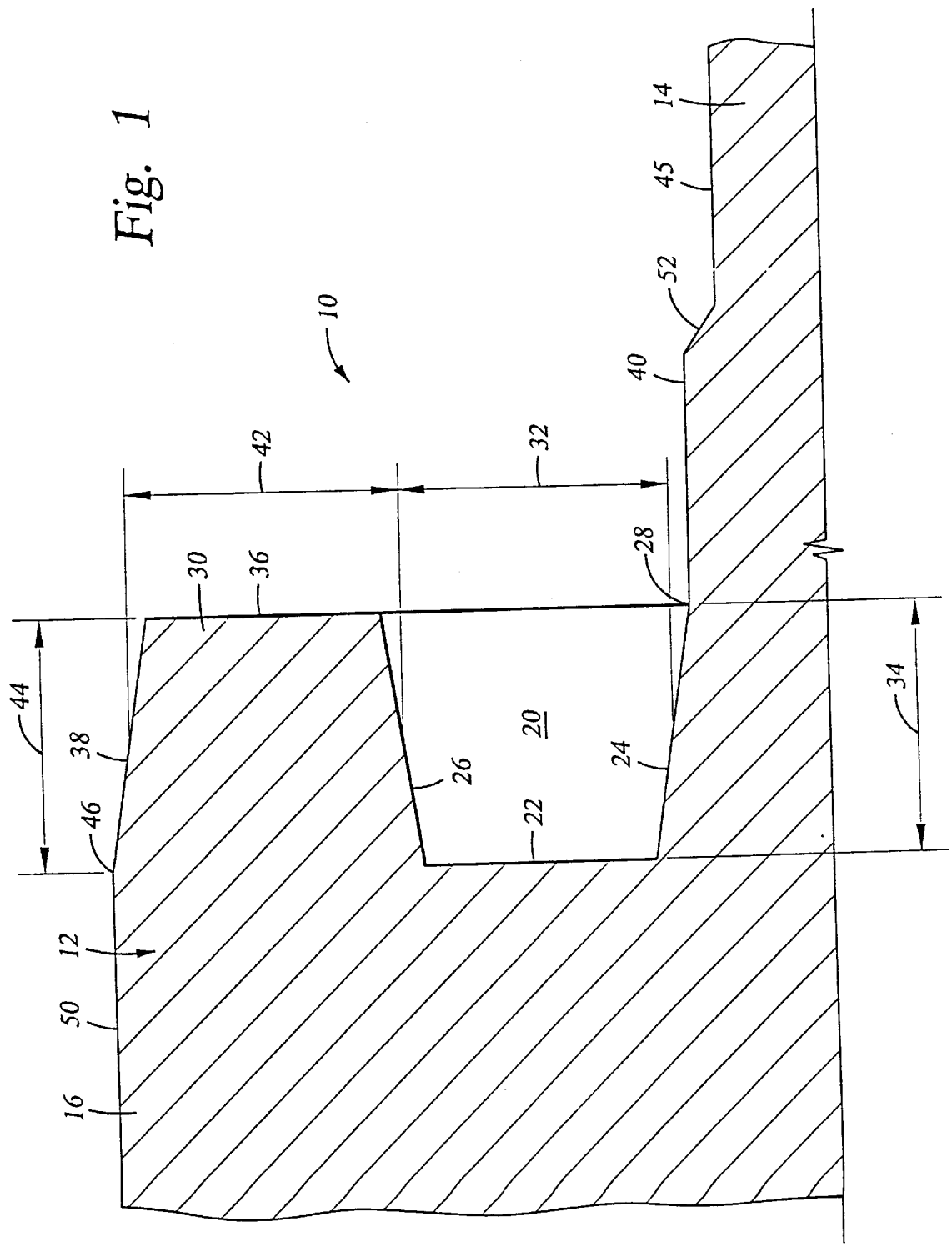
FIG. 1 is a cross-sectional view of the configuration of the sealing system on one of the connection members.

Referring initially to FIG. 1, the sealing system of the present invention includes a seal configuration 10 disposed on each of the two members being connected, such as for example, on the pin or box members of a tubular connection. The seal configuration 10 is shown on a tubular member 12 having a main tubular body 16 with a tubular end 14. Tubular member 12 is cylindrical and includes a flow bore 18 (shown in FIG. 3) which is subjected to internal pressures and an outer cylindrical surface 19 (shown in FIG. 3) around the outside of tubular member 12 which is subjected to external pressures. Typically, seal configuration 10 on tubular member 12 is associated with a fastening means, such as threads or flanges, for structurally connecting the members of the connection.

Seal configuration 10 includes a tongue and groove formed by an annular groove 20 and an adjacent annular shoulder or tooth 30. Annular groove 20 includes an undercut shoulder or surface 22 and inwardly tapering annular sides 24, 26. Tapering sides 24, 26 form inner and outer frustoconical surfaces whereby the greatest radial width 32 of groove 20 is at its mouth 28 and its smallest radial width is at undercut surface 22. Groove 20 has an axial depth 34. Undercut surface 22 is generally perpendicular to the axis of the flow bore 18 of member 12. Frustoconical sides 24, 26 have a taper with respect to the axis of the flow bore 18 at a ratio of 1 radial unit to 6 longitudinal units, although other ratios may be used.

The end 14 of tubular member 12 includes a first diameter, cylindrical pre-ramp surface 48 and a second diameter, cylindrical seal surface 40. A frustoconical ramp 52 forms a transition surface between pre-ramp surface 48 and seal surface 40.

Tooth 30 includes an annular shoulder 36 and inner and outer tapering sides 26, 38. It, of course, is appreciated that one side of tooth 30 is common with and forms one side of groove 20. Tooth 30 includes a radial width 42 and an axial length 44. The axial length 44 of tooth 30 is preferably the same as the axial depth 34 of groove 20. The other side 38 of tooth 30 is also tapered at a ratio of 1 to 6 and forms a frustoconical surface. At the base 46 on side 38 of tooth 30 there extends a cylindrical surface 50 along the main body 16 of member 12.

A seal configuration, identical and complimentary to disposed on the other connection member. The radial width 42 of tooth 30 is slightly wider pthan the radial width 32 of groove 20. Thus, the tooth 30 is wider than the groove 20 and therefore, tooth 30 is wider than the groove on the other connection member into which it is inserted. Likewise, groove 20 is narrower than the tooth on the other connection member which it receives. Thus, there is a planned interference between the frustoconical surfaces 24, 26, and 38 between the respective teeth and grooves of the two members to be connected.

Figure 2:
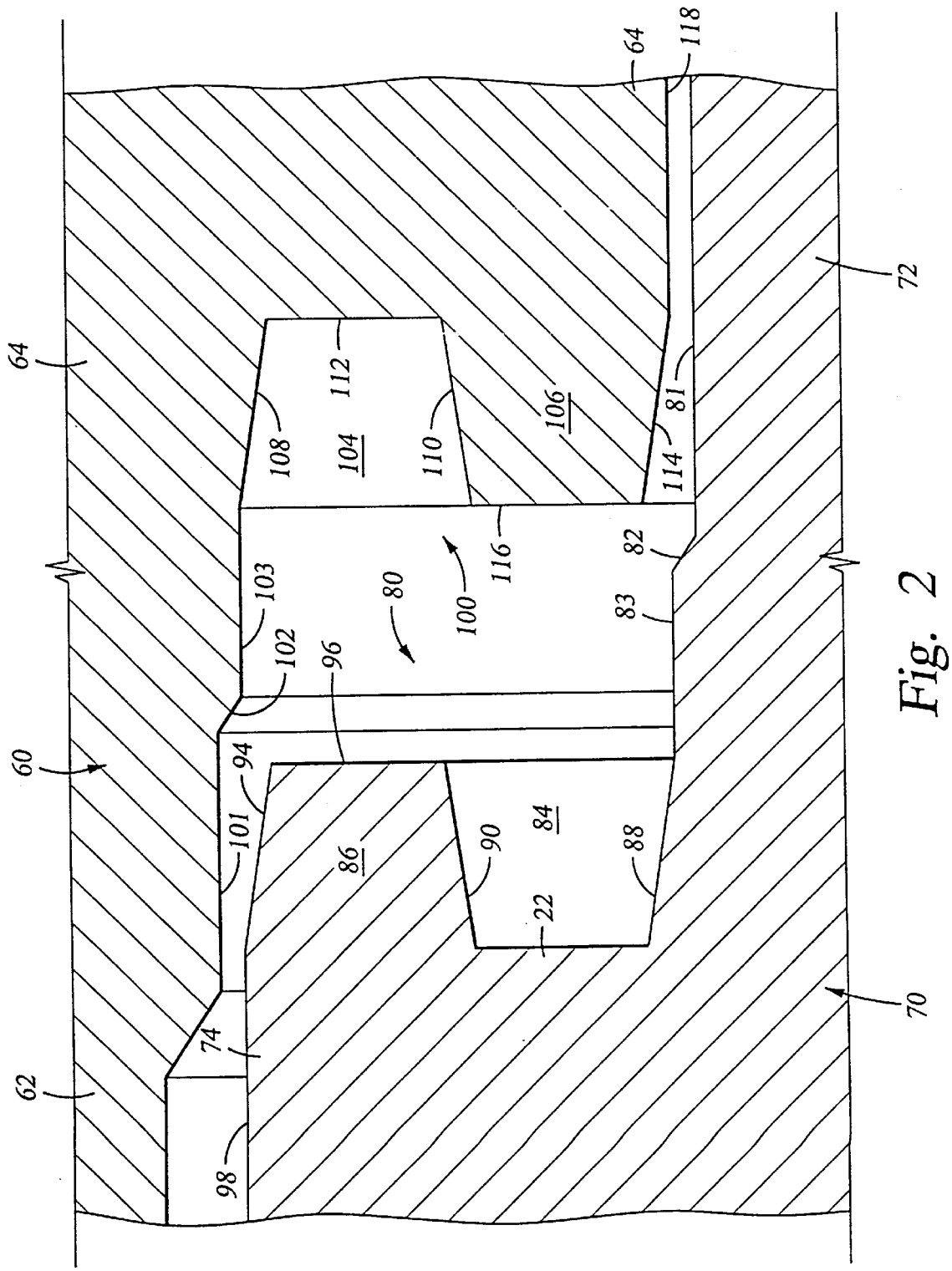
FIG. 2 is a cross-sectional view of the sealing system on pin and box members just prior to the assembly of the sealing system.
Figure 3:
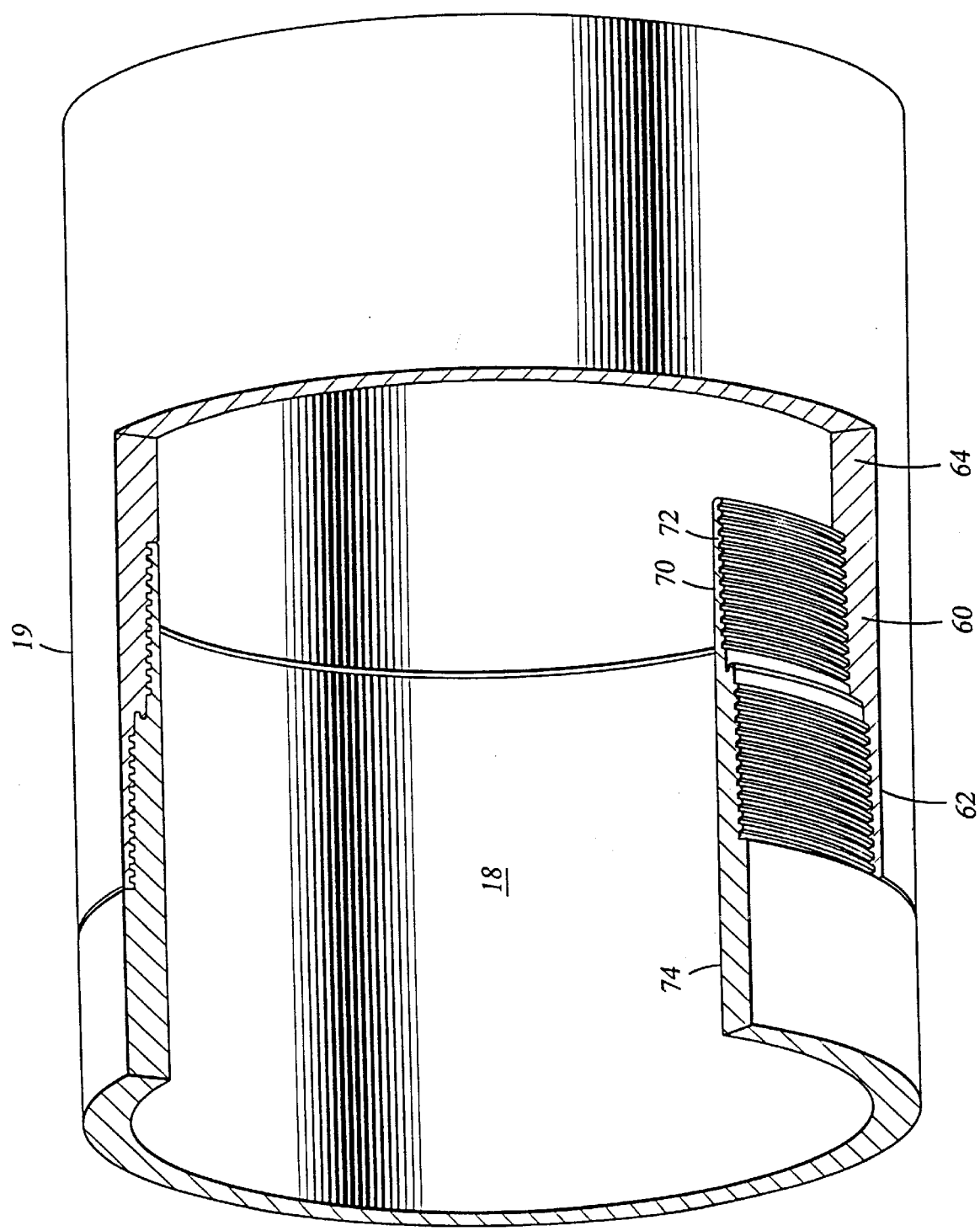
FIG. 3 is a perspective view of a connection utilizing the sealing system of FIG. 1.

Referring now to FIGS. 2 and 3, there is shown a box member 60 and a pin member 70. Box member 60 includes a box end 62 and a main body 64. Likewise, pin member 70 includes a pin end 72 and a main body 74. Pin member 70 and box member 60 together form flow bore 18 and outer cylindrical surface 19, both of which are subjected to internal and external fluid pressures, respectively. FIG. 3 illustrates the sealing system on the connection described in U.S. Pat. No. 5,652,315, incorporated herein by reference.

Referring particularly now to FIG. 2, the seal configuration 80 of pin member 70 includes a pre-ramp cylindrical surface 81, a frustoconical ramp 82, a seal cylindrical surface 83, an annular groove 84, and an annular tooth 86. Groove 84 includes an inner frustoconical surface 88, an outer frustoconical surface 90 and an annular undercut surface 92. Tooth 86 includes an outer frustoconical surface 94, an inner frustoconical surface 90, and an annular shoulder surface 96. A substantially cylindrical surface 98 extends from the base of tooth 86 along the main body 74 of pin member 70.

Box member 60 likewise includes a seal configuration 100 with a pre-ramp cylindrical surface 101, a frustoconical ramp 102, a seal cylindrical surface 103, an annular groove 104, and an annular tooth 106. Annular groove 104 includes an inner frustoconical surface 108, an outer frustoconical surface 110 and an annular undercut surface 112. Tooth 106 includes an outer frustoconical surface 114, an inner frustoconical surface 110, and an annular shoulder surface 116. A cylindrical surface 118 extends from the base of tooth 106 along the main body 64 of box member 60.

Figure 4:
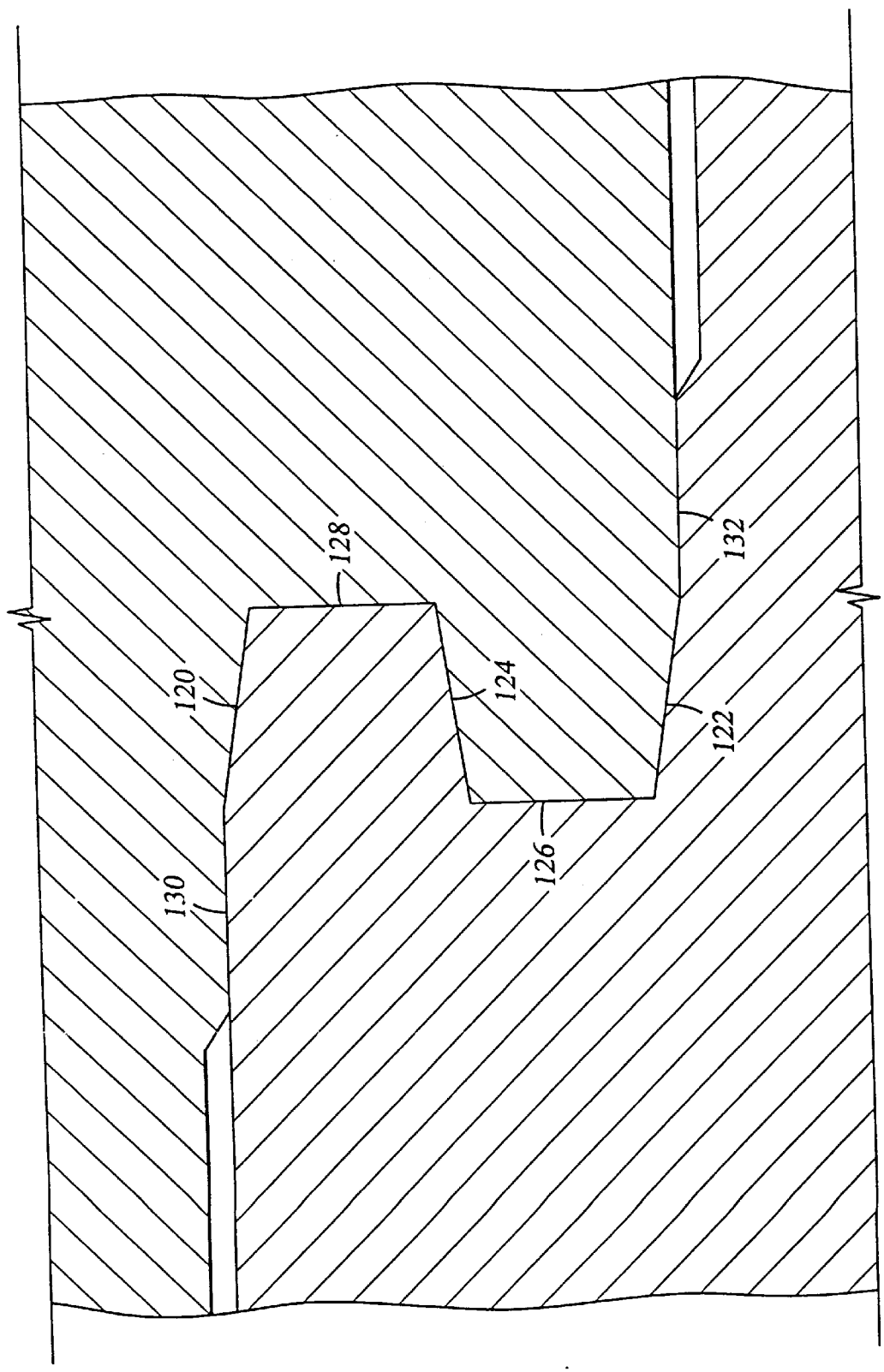
FIG. 4 is a cross-sectional view of the sealing system in its assembled position.

Referring now to FIGS. 2 and 4, upon assembly of the seal configurations 80 and 100 to form the sealing system of the present invention, pin end 72 is inserted into box end 62 with box and pin outer frustoconical surfaces 114, 94 clearing pin and box pre-ramp cylindrical surfaces 81, 101, respectively, and then initially engaging pin and box frustoconical ramps 82, 102, respectively. These initial engagements align and guide pin member 70 into box member 60 and more particularly align and guide pin seal configuration 80 into box seal configuration 100. As the assembly progresses, the box and pin outer frustoconical surfaces 114, 94 ride up on pin and box ramps 82, 102, respectively. Thereafter, cylindrical surface 118 extending from tooth 106 rides up on seal cylindrical surface 83 making nominal contact therewith, and cylindrical surface 98 extending from tooth 86 rides up on seal cylindrical surface 103 making nominal contact therewith. Thus, pre-ramp cylindrical surfaces 81, 101, ramps 82, 102, cylindrical surfaces 83, 103, and cylindrical surfaces 98, 118 act as stabbing guides and provide self-alignment of seal configurations 80, 100 and in particular provide means for guiding, aligning, and funneling teeth 86, 106 into grooves 104, 84, respectively.

Upon further makeup of pin member 70 into box member 60, interfering metal-to-metal contact occurs between pin and box center frustoconical surfaces 90, 110. Upon further tightening of the assembled connection, the pin and box teeth 86, 106 are funneled and interferingly forced into box and pin grooves 104, 84, respectively. Thus, the box and pin outer frustoconical surfaces 114, 94 interferingly and sealingly engage pin and box frustoconical surfaces 88, 108, respectively. Upon final power tightening (torquing) of the assembled connection, the box and pin annular shoulder surfaces 116, 96 engage the pin and box annular undercut surfaces 92, 112, respectively.

Figure 5:
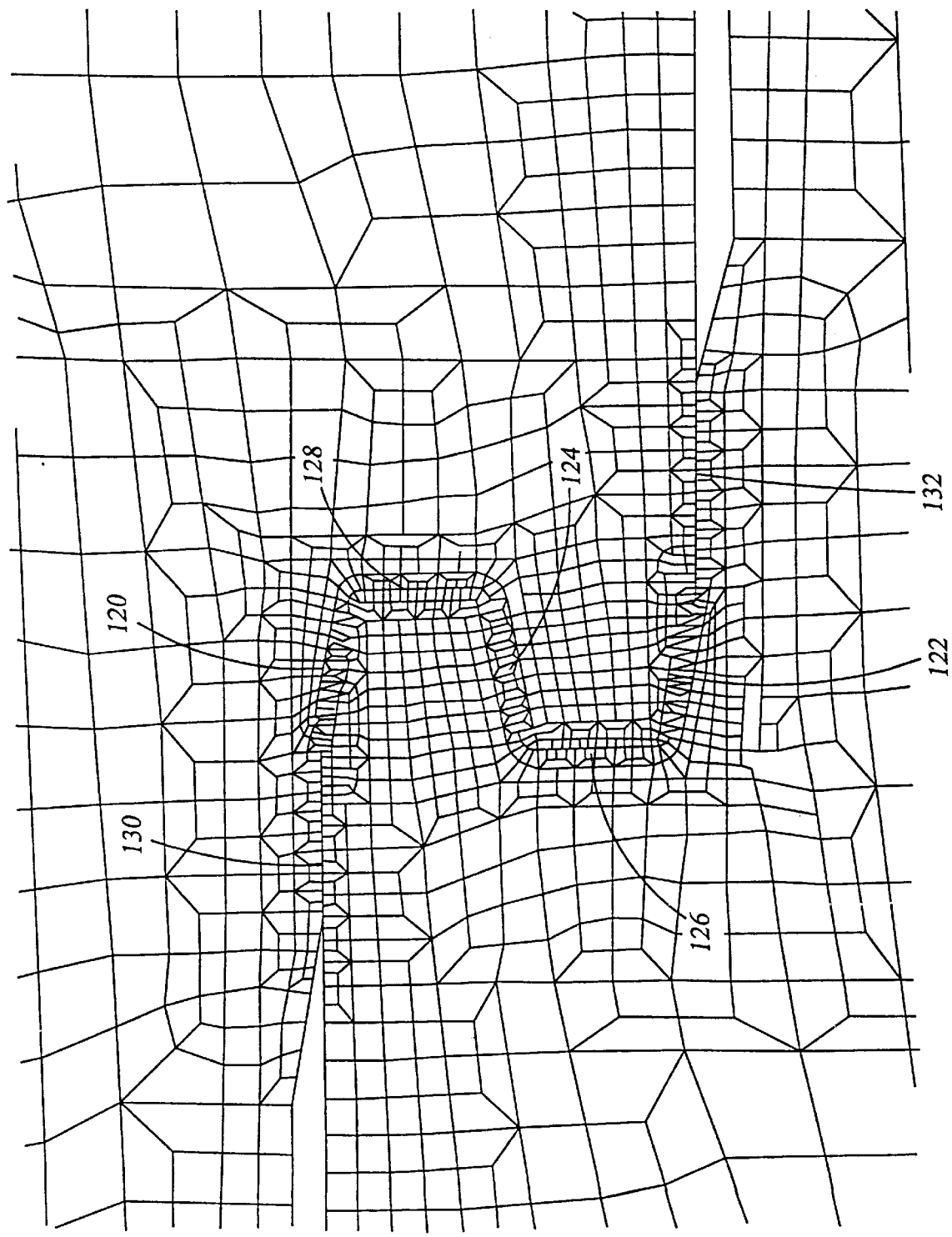
FIG. 5 is a diagram representing the finite element analysis of the sealing system of the present invention in its assembled position.

Referring particularly now to FIGS. 4 and 5, after final power tightening of the assembled connection, a total of at least two and up to seven metal-to-metal seals are established between pin and box members 60, 70. Three of the seven seals are frustum seals. A first outer frustum seal 120 is formed by the engagement of pin and box frustoconical surfaces 94, 108 and a second inner frustum seal 122 is formed between pin and box frustoconical surfaces 88, 114. The third frustum seal is a center frustum seal 124 formed between pin and box center frustoconical surfaces 90, 110. Two annular shoulder seals are formed. A first inner annular shoulder seal 126 is formed try the engagement of annular shoulder surface 116 and annular undercut surface 92 and a second outer annular shoulder seal 128 is formed by the engagement of annular shoulder surface 96 and annular undercut surface 112. Two cylindrical seals are formed. A first outer cylindrical seal 130 is formed by the engagement of pin and box seal cylindrical surfaces 98, 103 and a second inner cylindrical seal 132 is formed by the engagement of pin and box seal cylindrical surfaces 83, 118. Under normal operating conditions and manufacturing tolerances, up to seven seals may be established by the sealing system of the present invention, namely frustum seals 120, 122, 124, annular shoulder seals 126, 128, and cylindrical seals 130, 132. FIG. 5 diagrammatically illustrates the contact pressures of the sealing surfaces forming these seals.

Figure 6:
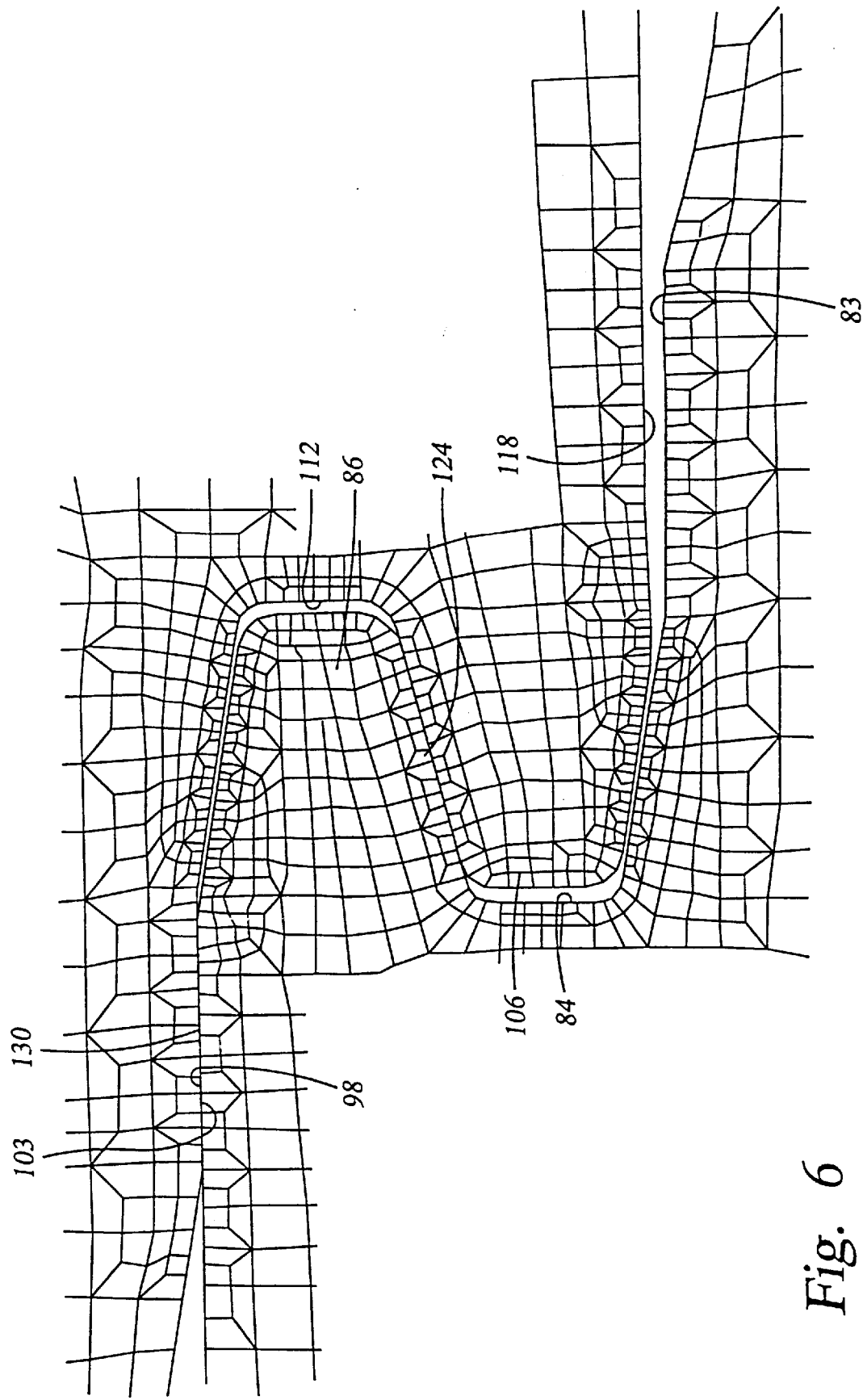
FIG. 6 is a diagram representing the finite element analysis of the sealing system of the present invention in the offset condition with internal pressure penetration.

Referring now to FIG. 6, there is shown the offset condition of the sealing system with pressure penetration which is the worst case for the sealing system of the present invention. The pressure penetration may be internal or external. For purposes of discussion, internal pressure will be assumed. The worst combination of tolerances is a skewed interference where there is a maximum interference at the pin and box seal cylindrical surfaces 98, 103, a minimum interference at the inner pin and box cylindrical surfaces 83, 188, and a minimum interference between the annular teeth 86, 106 and grooves 84, 112 on both the pin and box members 70, 60. Minimum interferences of the teeth and grooves means the widest possible grooves 84, 112 and the narrowest possible teeth 86, 106. If there were no pressure penetration, the sealing system of the present invention would maintain at least three seals, namely the center frustum seal 124 and the two cylindrical seals 130, 132 even with the skewed interferences. However, if, internal fluid pressure is allowed to penetrate through all the threads to the cylindrical seal 132, the fluid pressure will relieve cylindrical seal 132 and will bend the annular tooth 106 towards the other annular tooth 86 thereby increasing the interference at the center frustum seal 124. Therefore, in the worst case, i.e. the offset case with fluid penetration, at least two seals, namely the center frustum seal 124 and the outer cylindrical seal 130 (in the case of internal pressure penetration), will maintain high contact pressure. The configuration of the mating sealing surfaces is such that the total makeup energy redeploys to provide sealing bearing pressure at the center frustum seal 124 and at least one of the other six seals. Thus, even in the worst case, the sealing system of the present invention always provides at least two seals.

In the operation of the sealing system of the present invention, the sealing system focuses on the center frustum seal 124 and then works radially outward. There will always be some combination of seals which are maintained with the center frustum seal 124 being the primary seal. The center frustum seal 124 and at least one other of the metal-to-metal seals is always in sealing engagement. This is true without regard to the tolerances of the various sealing surfaces and without regard to the loads placed on the connection. No matter what forces are applied to the connection, such as tension, compression, interior pressure, exterior pressure, bending or torsion, the center frustum seal 124 will maintain sealing engagement. Interior or exterior pressure penetration actually enhance the sealing engagement of center frustum seal 124 by applying a force either on annular tooth 86 or 106, depending upon whether interior or exterior pressure is applied, and causing that tooth to be forced into enhanced engagement with the other tooth. Thus, if internal fluid pressure is placed within the flow bore 18, the interferences between the frustum seals 120, 122, 124 will be even more accentuated. The same will occur upon fluid pressure on the outer cylindrical surface 19 of the connection. Therefore, when internal or external pressure penetrates the threads to the seals, the sealing engagement of the center frustum seal 124 only becomes tighter. Thus, the sealing system of the present invention is a self-compensating sealing system.

It is preferred that the sealing system be located near the center of the connection so as to minimize the affect on the sealing surfaces by the loads placed on the connection. The center of a connection provides the most stability between the sealing surfaces. It is preferred that the sealing system of the present invention be used in a connection, such as that described in U.S. Pat. No. 5,415,442 and 5,462,315, incorporated herein by reference, where the sealing system is located in a generally static field at the center of the connection. In such a connection, the structure around the sealing system has balanced stresses and relatively low stresses throughout. Balanced stresses limit the relative movement of the sealing surfaces. In prior art sealing systems, as loads on the connection change, the contact pressures of the sealing surfaces also change thereby causing the stability of the entire seal assembly to change.

Upon the assembly of the connection, the sealing system of the present invention is encapsulated in an elastic envelope of steel making up the connection. The extremely high contact pressures caused by the interference between the sealing surfaces is controlled by the constant makeup torque of the connection. If forces were to be placed on the metal which were greater than the elastic limit of the metal, then the metal would be permanently deformed. Once the metal is permanently deformed, and the load on the sealing system is changed, the same sealing contact pressures can no longer be achieved when the sealing surfaces are brought back into sealing engagement. This is particularly true in a cyclic environment. However, the stresses are only locally plastic in the area around the center frustum seal 124. It is locally plastic because it exceeds the yield point only locally at seal 124. However, because this area is plastic and is surrounded by a big elastic shell or envelope, seal 124 tends to be stable once the connection is made up. This allows center frustum seal 124 to maintain contact pressure no matter what forces are applied to the connection.

A constant makeup torque is applied to tubular connections upon assembly thus providing a constant energy level to be stored in the sealing system of the present invention. Since the sealing system is made up of essentially a constant torque, the engaging surfaces of the sealing system are preloaded the required amount so as to maintain pressure tightness and the energy redistributes itself depending upon the relative tolerances and thus interferences between the mating surfaces. The amount of elastic energy in the sealing system is a function of how much energy is absorbed and stored by the elastic envelope surrounding the seals. Thus, the energy in the sealing system is distributed among all of the engaging sealing surfaces depending upon the relative positioning of the mating surfaces within the sealing system. It makes no difference in the sealing system of the present invention how that energy is distributed based on the tolerances of the connection because without regard to the tolerances, there will be enough energy to provide at least two seals.

The makeup torque. is always sufficient to drive or force the box and pin teeth 106, 86 into the pin and box grooves 84, 104, respectively, depending upon the tolerances. If a constant base makeup torque is always provided, it is ensured that at that base torque, the shoulder surfaces 96, 116 of teeth 86, 106, respectively, will shoulder and bottom against the annular undercut surfaces 92, 112 of grooves 84, 104, respectively. The axial interference of the annular shoulder seals 126, 128 is generated by the threads of the connection during the constant makeup torque.

By locating the sealing system in an elastic envelope of metal, the annular shoulder seals 126, 128 will be maintained upon the application of a certain amount of tension on the connection. As tension is applied to the connection, the engagement between shoulder surfaces 96, 116 and undercut surfaces 92, 112 will tend to relieve. As the contact pressure tends to relieve, the elasticity of the metal causes the sealing surfaces to maintain sealing engagement of up to 50 to 75% of tension placed on the connection depending upon the actual dimensions of the pin and box members. This elasticity is particularly important in maintaining the two annular shoulder seals 126, 128 and the three frustum seals 120, 122, and 124 as the connection is placed in tension.

The annular shoulders seals 126, 128 are most important when the connection is in compression where annular shoulder seals 126, 128 will always be in sealing engagement. When there is a minimum of interference at the cylindrical surfaces, the sealing engagement is increased at annular shoulder seals 126, 128. The engagement of annular shoulder surfaces 96, 116 with annular undercut surfaces 92, 112 are most important when there are minimum interferences at the other sealing locations. However, the annular shoulder seals 126, 128 need not seal for the overall sealing system of the present invention to be effective.

Figure 7:
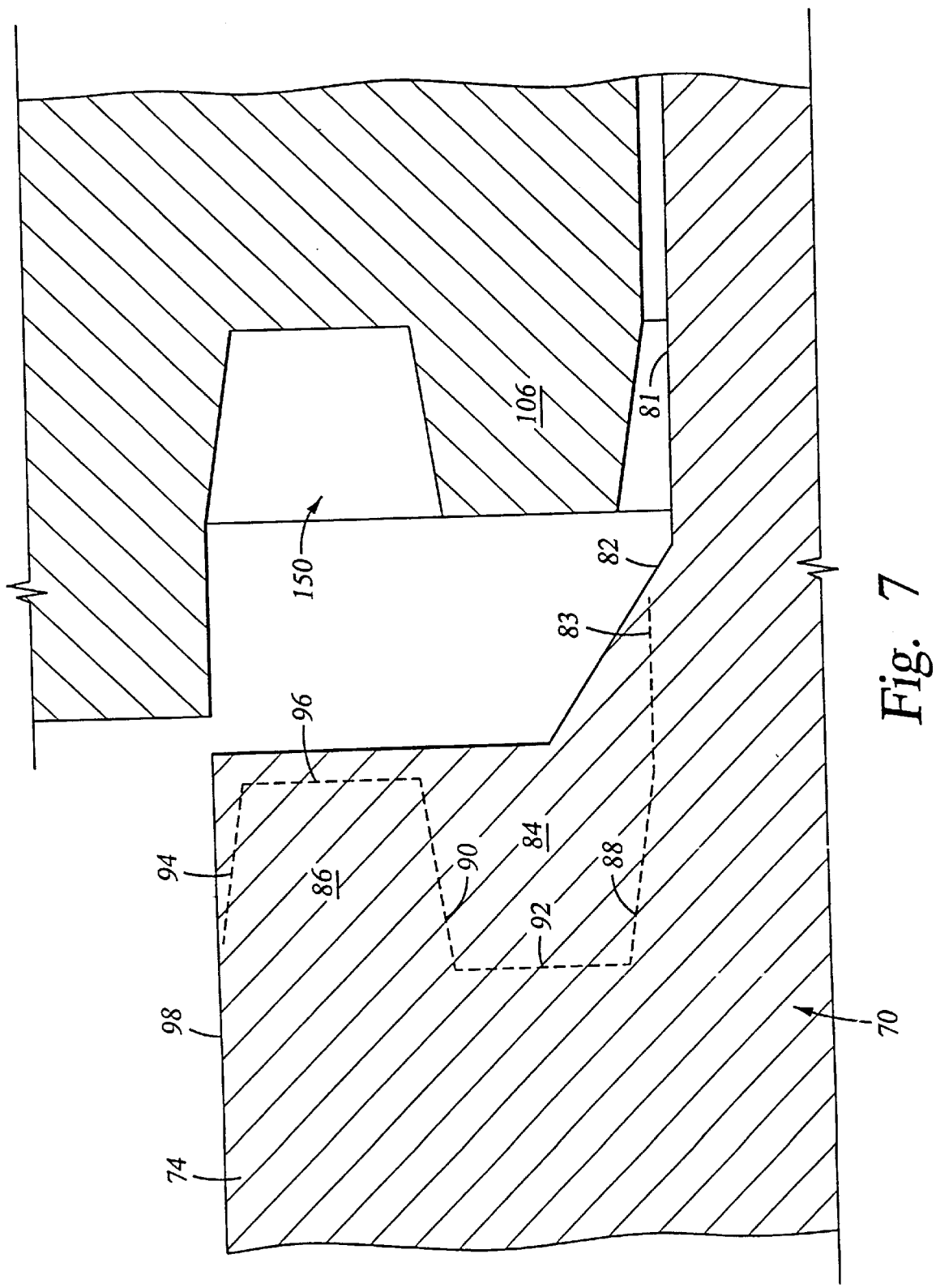
FIG. 7 is a cross-sectional view of a portion of the carbide tool insert in position to cut six sealing surfaces of the sealing system on the pin member shown in FIG. 2.

Referring now to FIG. 7, there is shown a carbide tool insert 150 positioned to cut the sealing surfaces on pin member 70. Cylindrical surface 98 adjacent tooth 86 and ramp 82 and pre-ramp cylindrical surface 81 are first turned on a lath with extra material 152 to be removed. The carbide tool insert 150 is mounted on a CNC machine (not shown). A single plunge cut is then made into the body 74 of pin member 70 cutting six sealing surfaces namely seal cylindrical surface 83, inner frustoconical surface 88, annular undercut surface 92, center frustoconical surface 90, annular shoulder surface 96, and outer frustoconical surface 94.

The machine tolerances for independent surfaces the sealing system of the present invention are between 0.004 and 0.006 inches. All other prior art premium connection manufacturers must hold tolerances to 0.002 inches or possibly 0.001 inches to define the absolute positions of the sealing surfaces. It is difficult to hold tolerances to plus or minus 0.002 inches. The inability to hold such close. tolerances often causes up to 75% rejects. To a machinist, there is a great difference between a tolerance of 0.006 inches as compared to a tolerance of 0.002 inches. The positioning of the carbide tool for the sealing system of the present invention with respect to the walls of the pin and box members 60, 70 can be 0.006 of an inch or more.

By using a single carbide tool insert 150 to cut the sealing surfaces of the present invention, the tolerances of the sealing surfaces can approach the tolerances of the carbide tool insert 150. This is made possible by cutting the sealing surfaces in a single plunge cut so as to avoid multiple passes or strokes of the CNC machine with the carbide tool insert 150. The tolerances of the carbide tool insert 150 are typically measured in 10 thousandths of an inch such as ±0.0003 inches. The process for making the inserts 150 is very accurate and therefore better tolerances may be achieved. Thus, the single cut to form the sealing surfaces of the present invention allows the tolerance range to be within a few thousandths of an inch allowing a controlled interference within a very tight tolerance band. So long as the dimensions are within the tolerance band, the annular tooth will always be larger than the groove thereby ensuring an interference between sealing surfaces 90, 110 (See FIG. 2). Accurate tolerances allow the interference at the center frustum 124 to be relatively constant. Not only are positive interferences required to generate contact pressures between the sealing surfaces, but a positive amount of contact pressure is required over the entire range of tolerances. Since the tolerances of the sealing surfaces of the present invention are controlled by the carbide tool insert 150, the tolerance range of the present invention may be slightly greater than that typically required by the prior art.

The sealing system of the present invention allows six of the seven sealing surfaces to be cut by a single carbide tool insert upon a single plunge cut into the pipe member. Thus, the shape and tolerances of all of the sealing surfaces are controlled by the profile of carbide tool insert 150. This allows good dimensional control. Of the six sealing surfaces cylinders 98, 118 (See FIG. 2) are not controlled by the shape of the carbide tool insert 150. The carbide insert tool 150 also controls the shoulder depths of teeth 86, 106 (See FIG. 2) and the tangency point on the cylinders 83, 103 (See FIG. 2). The sealing system of the present invention does not require the control of the outside turning system as in prior art sealing systems. As a result, five seals are always in positive control, namely the center frustum 124, the two annular shoulder seals 126, 128, and the inner and outer frustum seals 120, 122 (See FIG. 2). The only seals with uncontrolled surfaces are the cylindrical seals 130, 132, one of those surfaces are controlled as are their axial location.

The sealing system of the present invention is insensitive to the tolerances of the sealing surfaces and does not require an absolute positioning of the sealing surfaces on the pin and box members 70, 60. In cutting the profiles of the sealing surfaces, a first cutting profile is made in the pin member 70 and then another cutting profile is made in the box member 60. Since one profile is complimentary to the other profile, only the relationship of one profile to another is important and not their absolute positioning with respect to the bodies of the pin and box members 70, 60. All prior an sealing surfaces for connections require absolute position control with respect to the pin and box members. No such absolute positioning is required by the sealing system of the present invention.

In the sealing system of the present invention, the interference between sealing surfaces causing sealing engagement is primarily a function of the relative fit between annular teeth 86, 106 and grooves 84, 104 (See FIG. 2). The ramps 82, 102 and seal cylindrical surfaces 83, 103 guide and align teeth 86, 106 into the annular grooves 84, 104 within a range of 10 to 15 thousandths of an inch, and the annular teeth 86, 106 and grooves 84, 104 are then forced together by the makeup torque to achieve a relatively constant interference. Since the guide surfaces in the form of the ramps 82, 102, and seal cylinders 83, 103 control radial alignment, the X-Y positions of the sealing surfaces need only be relative with respect to the X-Y dimensions of the pin and box members 70, 60. So long as the sealing surfaces are in reasonable close proximity, the teeth 86, 106 will funnel into grooves 84, 104 and the cylindrical surfaces 83, 103 will guide and align the seal configurations together. The enlarged teeth 86, 106 are forced into reduced grooves 84, 104, respectively. Therefore, no matter where the metal-to-metal sealing surfaces are located with respect to their absolute positioning on the pipe members, there will be a sealing engagement so long as the annular teeth are funneled into the grooves.

Since the teeth 86, 106 are larger than the grooves 84, 104, the tolerances of the sealing surfaces allow a wider range or band of tolerances within which the actual dimensions of the teeth and grooves will permit sealing engagement. Therefore, without regard to whether the diametrical dimensions of the teeth 86, 106 and grooves 84, 104 are smaller or larger within their range of tolerances, the contact pressure of the seals is not a direct function of and is isolated from the absolute diametrical positioning of the sealing surfaces with respect to the pin and box members. Any differences in a diametrical dimensions of the cylinders are accounted for by the ramps and cylindrical surfaces. Thus, the placement of the sealing surfaces need only be relative to the absolute positioning with respect to the pipe as distinguished from prior art seals which must relate to an absolute diametrical position. The tolerances required by the sealing system of the present invention are not as critical as those of the prior art.

The sealing system of the present invention is rated to 60,000 to 100,000 psi. The pipe commonly used in the oil industry is rated from 5,000 to 25,000 psi. Thus, the sealing system of the present invention has a rating 4 to 20 times greater than that of the pipe, i.e. or what is needed.

While a preferred embodiment of the invention has been shown and described, modifications thereof can be made by one skilled in the art without departing from the spirit of the invention.

We claim:

1. A method of producing sealing surfaces on a tubular member comprising:

machining a cylindrical reference surface around the tubular member, the reference surface having a first tolerance;

aligning a carbide cutting tool with respect to the reference surface; and machining a plurality of sealing surfaces with the carbide cutting tool during one pass of the carbide cutting tool, the sealing surfaces having second tolerances which are less than the first tolerance.

2. The method of claim 1 wherein the first tolerance is in the range of ±0.004 to ±0.006 inches.

3. The method of claim 1 wherein the second tolerance is ±0.0003 inches.

4. The method of claim 1 further including machining all of the sealing surfaces during each pass of the carbide cutting tool.

5. The method of claim 1 wherein the sealing surfaces all have a tolerance of ±0.0003 inches there between.

6. The method of claim 1 further including machining a profile on the tubular member forming the sealing surfaces.

7. The method of claim 1 wherein the tubular member has an axis and the sealing surfaces form a groove having sealing surfaces substantially parallel with the axis of the tubular member.

8. The method of claim 7 wherein at least two of the sealing surfaces forming the groove have positions opposite each other and have a radial distance there between with a tolerance of ±0.0003 inches.

9. The method of claim 1 wherein the tubular member has an axis and the sealing surfaces form an annular tooth having sealing surfaces substantially parallel with the axis of the tubular member.

10. The method of claim 9 herein at least two of the sealing surfaces forming the annular tooth have a radial distance there between with a tolerance of ±0.0003 inches.

11. The method of claim 1 further including another reference surface aorund the tubular member with a another tolerance, wherein the another tolerance is greater than the second tolerances of the sealing surfaces.

12. The method of claim 1 wherein the carbide cutting tool has a tolerance and the second tolerance approaches the tolerance of the carbide cutting tool which is less than ±0.001 inches.

13. The method of claim 1 further including forming a transition surface between the cylindrical reference surface and the sealing surfaces.

14. The method of claim 1 wherein the carbide cutting tool has at least three cutting surfaces.

15. The method of claim 1 further including cutting six sealing surfaces with one plunge cut of the carbide cutting tool.

16. The method of claim 1 wherein the first tolerance is between 0.004 and 0.006 inches.

17. A method of producing mating sealing surfaces for a connection of first and second tubular members comprising:

machining a first cylindrical reference surface around the first tubular member, the first reference surface having a first tolerance;

aligning a carbide cutting tool with respect to the first reference surface;

machining a plurality of first sealing surfaces on the first tubular member with the carbide cutting tool, the first sealing surfaces having second tolerances which are less than the first tolerance;

forming a first transition surface between the first cylindrical reference surface and the first sealing surfaces;.

machining a second cylindrical reference surface around the second tubular member, the second reference surface having a third tolerance;

aligning a carbide cutting tool with respect to the second reference surface;

machining a plurality of second sealing surfaces on the second tubular member with the carbide cutting tool, the second sealing surfaces having fourth tolerances which are less than the third tolerance;

forming a second transition surface between the second cylindrical reference surface and the second sealing surfaces; and engaging the first and second sealing surfaces such that the second and fourth tolerances are independent of the first and third tolerances.

* * * * *